Patented Jan. 1, 1929.

1,697,109

UNITED STATES PATENT OFFICE.

HENRY DREYFUS, OF LONDON, ENGLAND.

MANUFACTURE OF ACETIC ACID.

No Drawing. Application filed May 27, 1926, Serial No. 112,163, and in Great Britain June 13, 1925.

This invention relates to the manufacture of acetic acid or acetone or both acetic acid and acetone.

I have found that when methyl formate vapour is passed at relatively high temperatures, for example between 100° and 400° or 450° C., and under pressure, preferably relatively high pressure, in contact with certain catalysts, namely substances which either are, or are capable of forming, acetates which decompose with the formation of acetic acid or acetone or both acetic acid and acetone at temperatures under about 400°—450° C. and preferably between about 200° and 300° C., the methyl formate can be transformed continuously into acetic acid and/or acetone. In this way and by employing such catalysts or mixtures, the methyl formate can be transformed to acetic acid and/or acetone which distills off or is evolved continuously with regeneration of the catalysts.

Some catalysts which may be employed for the manufacture of acetic acid, with or without acetone, are for example copper oxide, tin oxide, lead oxide, copper acetate, zinc oxide, zinc acetate, zinc methylate, aluminium methylate, tin methylate and like methylates, or mixtures of two or more of any of the foregoing with each other, or mixtures of any of them with more basic materials such as potassium acetate or sodium acetate. Mixtures of or containing one or more of the foregoing, for instance, the said metal methylates, with one or more alkali methylates such as potassium methylate or sodium methylate may also be used. Other catalysts or catalyst mixtures having a similar effect may however be employed.

The temperature at which the process is carried out may vary according to the catalysts employed or other circumstances between about 100° and 400° or 450° C., but is preferably between about 200° C. and 300° C. and the pressure employed may vary according to the catalysts or other circumstances, for example pressures may be used up to 200 atmospheres or more, but generally pressures of about 50 to 150 atmospheres may be used.

If, instead of employing substances or catalysts which either are, or are capable of forming acetates which decompose with formation of acetic acid under the action of heat, substances are used which either are, or form acetates which decompose to form acetone alone or in substantial quantities under the action of heat, a continuous production of acetone can take place, and the present invention likewise includes such a process.

What I claim and desire to secure by Letters Patent is:—

1. A process for the manufacture of acetic acid, which comprises isomerising methyl formate by heating it in the form of vapor under pressure in presence of a catalyst selected from the group comprising metal acetates which decompose with the formation of acetic acid at a temperature under about 450° C. and metal compounds capable of forming said acetates.

2. A process for the manufacture of acetic acid, which comprises isomerising methyl formate by heating it in the form of vapor under pressure at a temperature between 100° and 450° C. in presence of a catalyst selected from the group comprising metal acetates which decompose with the formation of acetic acid at a temperature under about 450° C., and metal compounds capable of forming said acetates.

3. A process for the manufacture of acetic acid, which comprises isomerising methyl formate by heating it in the form of vapor under pressure at a temperature between 200° and 300° C. in presence of a catalyst selected from the group comprising metal acetates which decompose with the formation of acetic acid at a temperature between about 200° and 300° C., and metal compounds capable of forming said acetates.

4. A process for the manufacture of acetic acid, which comprises isomerising methyl formate by heating it in the form of vapor under a pressure not exceeding 200 atmospheres in presence of a catalyst selected from the group comprising metal acetates which decompose with the formation of acetic acid at a temperature under about 450° C., and metal compounds capable of forming said acetates.

5. A process for the manufacture of acetic acid, which comprises isomerising methyl formate by heating it in the form of vapor under a pressure between 50 and 150 atmospheres in presence of a catalyst selected from the group comprising metal acetates which decompose with the formation of acetic acid at a temperature under about 450° C., and metal compounds capable of forming said acetates.

6. A process for the manufacture of acetic acid, which comprises isomerizing methyl formate by heating it in the form of vapor under a pressure not exceeding 200 atmospheres and at a temperature between 100° and 450° C., in presence of a catalyst selected from the group comprising metal acetates which decompose with the formation of acetic acid at a temperature under about 450° C., and metal compounds capable of forming said acetates.

7. A process for the manufacture of acetic acid, which comprises isomerising methyl formate by heating it in the form of vapor under a pressure between 50 and 150 atmospheres, and at a temperature between 200° and 300° C. in presence of a catalyst selected from the group comprising metal acetates which decompose with the formation of acetic acid at a temperature between about 200° and 300° C., and metal compounds capable of forming said acetates.

8. A process of producing acetic acid which comprises heating methyl formate vapors alone but in the presence of an isomerising catalyst to a temperature sufficient to convert the same into acetic acid.

In testimony whereof I have hereunto subscribed my name.

HENRY DREYFUS.